US012562797B2

(12) United States Patent
Yu et al.

(10) Patent No.: US 12,562,797 B2
(45) Date of Patent: Feb. 24, 2026

(54) CSI COMPRESSION BASED ON MULTI-DIMENSIONAL MIMO RF SIGNATURE

(71) Applicant: MEDIATEK INC., Hsinchu (TW)

(72) Inventors: Chia-Hao Yu, Hsinchu (TW);
Jiann-Ching Guey, Hsinchu (TW);
Tzu-Han Chou, San Jose, CA (US);
Chin-Kuo Jao, Hsinchu (TW)

(73) Assignee: MediaTek Inc., Hsin-chu (TW)

( * ) Notice: Subject to any disclaimer, the term of this patent is extended or adjusted under 35 U.S.C. 154(b) by 59 days.

(21) Appl. No.: 18/508,148

(22) Filed: Nov. 13, 2023

(65) Prior Publication Data

US 2024/0178896 A1 May 30, 2024

Related U.S. Application Data

(60) Provisional application No. 63/384,240, filed on Nov. 18, 2022.

(51) Int. Cl.
*H04B 7/06* (2006.01)

(52) U.S. Cl.
CPC ......... *H04B 7/0626* (2013.01); *H04B 7/0639* (2013.01)

(58) Field of Classification Search
CPC ........................... H04B 7/0626; H04B 7/0639
See application file for complete search history.

(56) References Cited

U.S. PATENT DOCUMENTS

| | | | | |
|---|---|---|---|---|
| 2022/0200666 A1* | 6/2022 | Lee | ...................... | H04B 7/0626 |
| 2022/0263552 A1* | 8/2022 | Hao | ..................... | H04B 7/0482 |
| 2024/0030981 A1* | 1/2024 | Fan | ...................... | H04B 7/0639 |
| 2024/0178896 A1* | 5/2024 | Yu | ......................... | H04B 7/0626 |
| 2024/0364393 A1* | 10/2024 | Ahmed | ................. | H04L 5/0048 |
| 2024/0380442 A1* | 11/2024 | Zhang | ................. | H04B 7/0417 |

OTHER PUBLICATIONS

European Intellectual Property Office Action 23210345.7-1206, dated Mar. 26, 2024 (8 pages).
Cewit: "Discussion on CSI Enhancements Forhigh/Medium UE Velocities and Coherent JT (CJT)".
Nokia et al: "CSI Enhancementfor High/Medium UE Velocities and CJT".

* cited by examiner

*Primary Examiner* — Jaison Joseph
(74) *Attorney, Agent, or Firm* — Helen Mao; Imperium Patent Works

(57) ABSTRACT

Method and user equipment (UE) are provided for CSI compression based on multi-dimensional MIO RF signature. In one novel aspect, the UE receives CSI-RS, estimates a basis matrix and a coefficient matrix of a downlink channel matrix based on the at least one CSI-RS, wherein the basis matrix is an N-dimensional non-orthogonal matrix, with N greater than two, and the coefficient matrix is a linear combination coefficient matrix for the basis matrix, and transmits to the network at least one feedback comprising feeding back the basis matrix in a first periodicity and feeding back the coefficient matrix in a second periodicity. In one embodiment, the UE compresses the basis matrix and the coefficient matrix to a feedback basis matrix and a feedback coefficient matrix before transmitting.

18 Claims, 6 Drawing Sheets

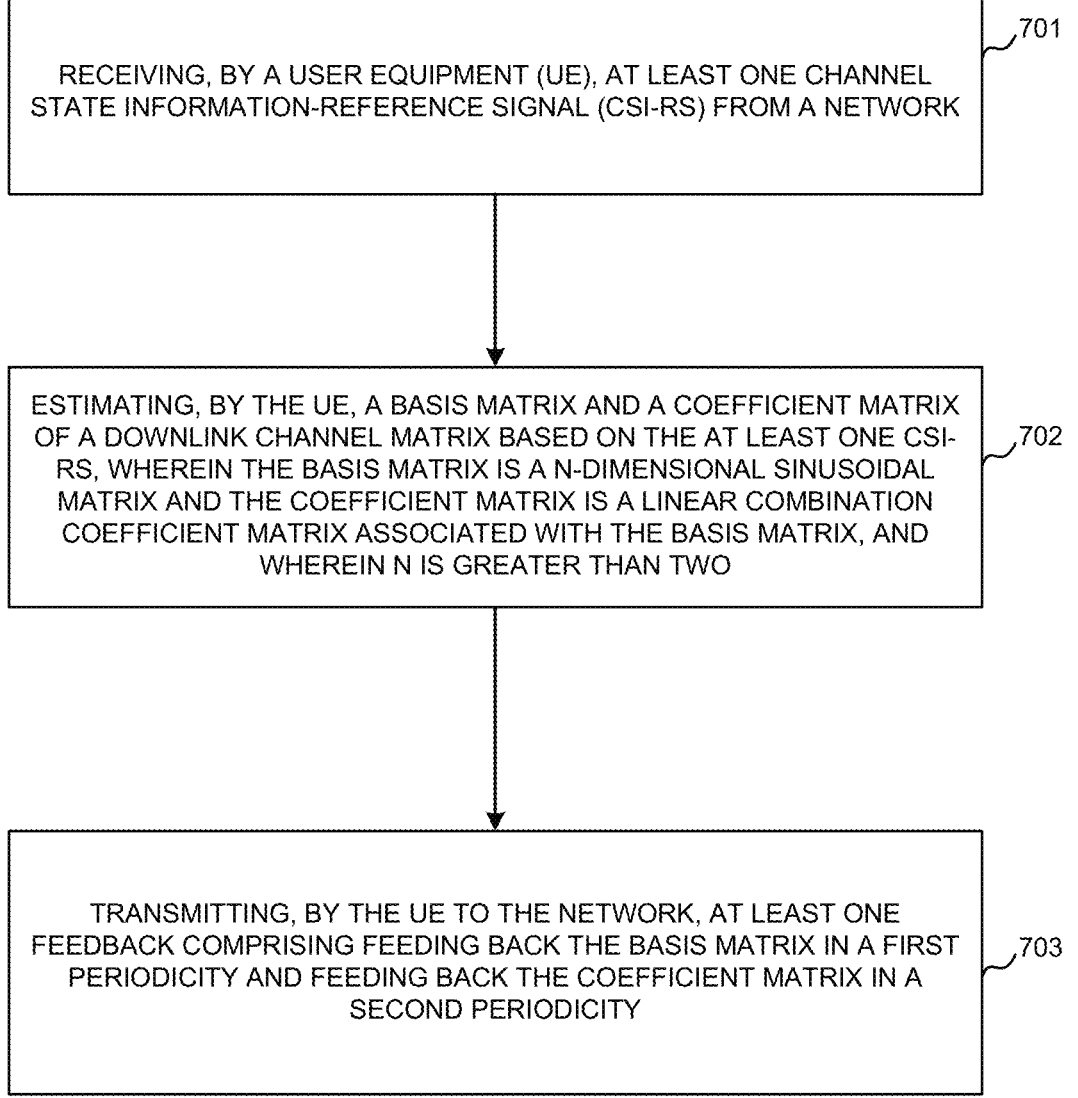

RECEIVING, BY A USER EQUIPMENT (UE), AT LEAST ONE CHANNEL STATE INFORMATION-REFERENCE SIGNAL (CSI-RS) FROM A NETWORK ⌐701

ESTIMATING, BY THE UE, A BASIS MATRIX AND A COEFFICIENT MATRIX OF A DOWNLINK CHANNEL MATRIX BASED ON THE AT LEAST ONE CSI-RS, WHEREIN THE BASIS MATRIX IS A N-DIMENSIONAL SINUSOIDAL MATRIX AND THE COEFFICIENT MATRIX IS A LINEAR COMBINATION COEFFICIENT MATRIX ASSOCIATED WITH THE BASIS MATRIX, AND WHEREIN N IS GREATER THAN TWO ⌐702

TRANSMITTING, BY THE UE TO THE NETWORK, AT LEAST ONE FEEDBACK COMPRISING FEEDING BACK THE BASIS MATRIX IN A FIRST PERIODICITY AND FEEDING BACK THE COEFFICIENT MATRIX IN A SECOND PERIODICITY ⌐703

FIG. 7

CSI COMPRESSION BASED ON MULTI-DIMENSIONAL MIMO RF SIGNATURE

CROSS REFERENCE TO RELATED APPLICATIONS

This application claims the benefit under 35 U.S.C. § 119 from U.S. provisional application Ser. No. 63/384,240, entitled "CSI COMPRESSION BASED ON MULTI-DIMENSIONAL MIMO RF SIGNATURE," filed on Nov. 18, 2022, the subject matter of which is incorporated herein by reference.

TECHNICAL FIELD

The disclosed embodiments relate generally to wireless communication, and, more particularly, to method and user equipment for CSI compression based on multi-dimensional multi-input multi-output (MIMO) radio frequency (RF) signature.

BACKGROUND

In the conventional network of 3rd generation partnership project (3GPP) 5G new radio (NR), the user equipment (UE) can measure channel state information reference signals (CSI-RSs) transmitted from a base station (BS) under a multi-input multi-output (MIMO) network, and determine downlink channel matrices according to the CSI-RSs. Then, the UE can calculate precoder(s) based on the downlink channel matrices, and report the compressed/quantized precoder(s) through precoding matrix indicator(s) (PMIs) to the BS using one of the specified codebooks. The legacy CSI feedback principle is to provide information on a selected precoder(s) by the UE. Therefore, the BS can transmit subsequent physical downlink shared channels (PDSCHs) by applying the precoder(s). The precoder information at the network node does not provide complete information for multi-use MIMO transmission scheme determination.

Enhancement and improvement are needed for the MIMO channel modeling for the CSI feedback with compression.

SUMMARY

Method and user equipment (UE) are provided for CSI compression based on multi-dimensional MIMO RF signature. In one novel aspect, the UE receives CSI-RSs, estimates a basis matrix and a coefficient matrix of a downlink matrix based on the at least one of the CSI-RSs, wherein the basis matrix is an N-dimensional sinusoidal matrix and the coefficient matrix is a linear combination coefficient matrix associated with the basis matrix, and transmits to the network at least one feedback comprising feeding back the basis matrix in a first periodicity and feeding back the coefficient matrix in a second periodicity. In one embodiment, the UE compresses the basis matrix and the coefficient matrix to a feedback basis matrix and a feedback coefficient matrix before transmitting. In one embodiment, one or more elements of the coefficient matrix are removed based on one or more coefficient compressing criteria comprising: removing one or more elements with value smaller than a predefined threshold, selecting a predefined number of elements, and selecting a predefined percentage number of elements. In one embodiment, the feedback coefficient matrix is derived by projecting the coefficient matrix on the at least one eigenvector matrix. In another embodiment, the compressing reduces receiving antennas dimension by eigenvalue decomposition or by singular value decomposition (SVD). In one embodiment, only the basis matrix is transmitted as a feedback when the feedback is for acquiring spatial domain channel characteristics for beam direction acquisition. In another embodiment, the basis matrix is parameterized by a group of N-dimensional parameter sets, and wherein the feeding back of the basis matrix is accomplished by feeding back the group of N-dimensional parameter sets. In yet another embodiment, doppler information components are reduced from both the basis matrix and the coefficient matrix for feedback.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 illustrates an exemplary flow chart for the CSI compression and feedback based on multi-dimensional MIMO RF signature in accordance with embodiments of the current invention.

DETAILED DESCRIPTION

Reference will now be made in detail to some embodiments of the invention, examples of which are illustrated in the accompanying drawings.

Figures 1, 2:
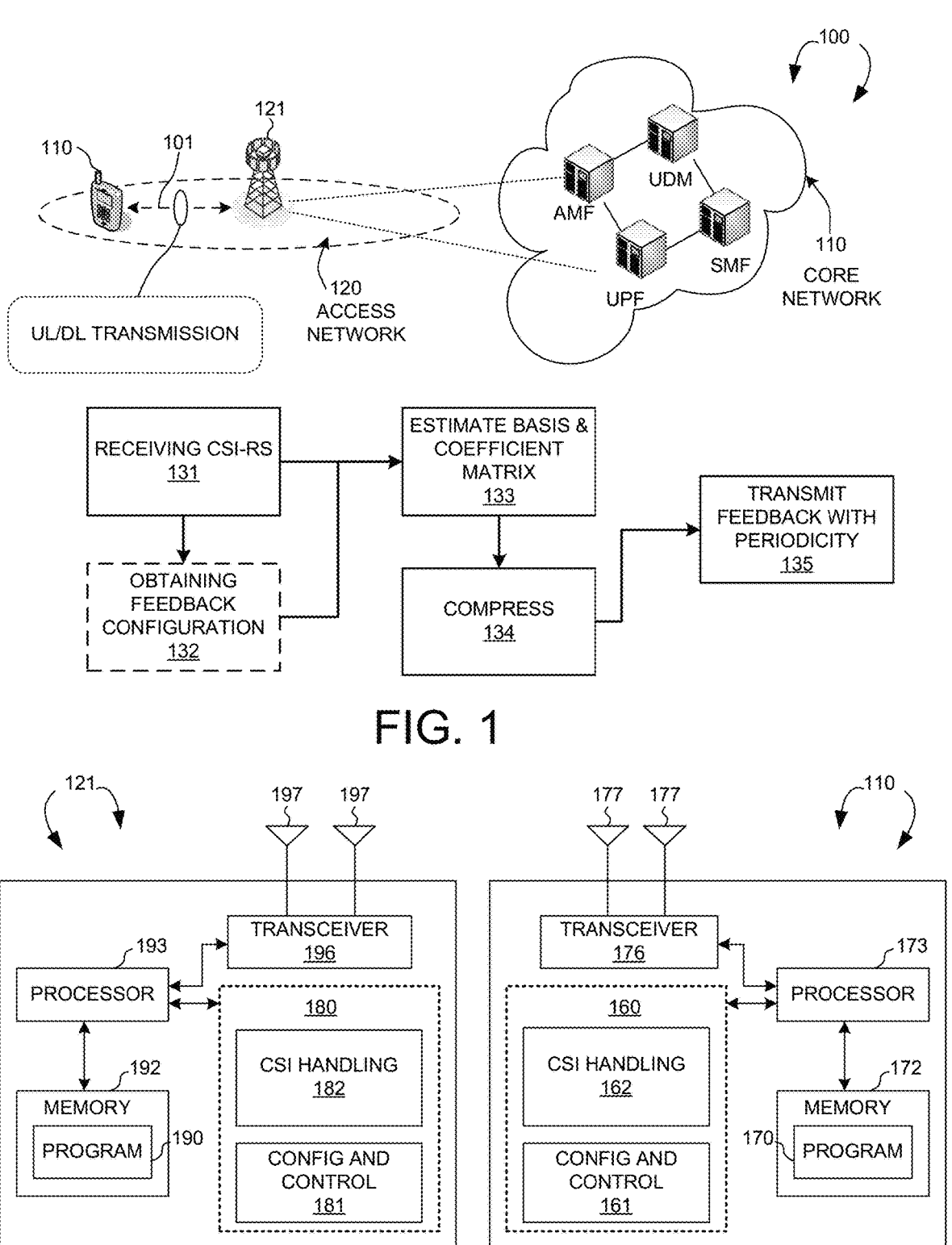
FIG. 1 illustrates an exemplary 5G new radio network supporting CSI compression based on multi-dimensional MIMO RF signature in accordance with embodiments of the current invention.
FIG. 2 is a simplified block diagram of the gNB and the UE in accordance with embodiments of the current invention.

FIG. 1 illustrates an exemplary 5G new radio network supporting CSI compression based on multi-dimensional MIMO RF signature in accordance with embodiments of the current invention. The 5G NR network 100 includes a user equipment (UE) 110 communicatively connected to a gNB 121 operating in a licensed band (e.g., sub 6 GHz or 30 GHz~300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to an Access and Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or a Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

In one novel aspect, the UE estimates a multi-dimensional non-orthogonal basis at a receiver based on a set of reference signals (RSs) transmitted by a transmitter(s) and feeds back the multi-dimensional non-orthogonal basis (e.g. N-dimensional sinusoidal matrix) in a first periodicity; and estimates a linear combination coefficients of the multi-dimensional non-orthogonal basis based on the set of reference signals and feeds back the linear combination coefficients in a second periodicity. As illustrated, at step 131, the UE receives reference signals, such as the CSI-RS. At step 132, the UE obtains feedback configurations. In one embodiment, the feedback configuration is predefined. In another embodiment, the feedback configuration is dynamically updated. At step 133, the UE estimates the basis matrix and the coefficient matrix. At step 134, the UE compresses the basis matrix and the coefficient matrix as a compressed feedback. At step 135, the UE transmits the compressed feedback to the network. While the multi-dimensional basis is in general non-orthogonal, in some embodiments, orthogonal basis is used as approximation.

FIG. 2 is a simplified block diagram of the gNB 121 and UE 110 in accordance with embodiments of the present invention. For the gNB 121, antennas 197 transmit and receive radio signal under MIMO network. A radio frequency (RF) transceiver module 196, coupled with the antennas 197, receives RF signals from the antennas 197, converts them to baseband signals and sends them to processor 193. RF transceiver 196 also converts received baseband signals from the processor 193, converts them to RF signals, and sends out to antennas 197. Processor 193 processes the received baseband signals and invokes different functional modules and circuits to perform features in the gNB 121. Memory 192 stores program instructions and data 190 to control the operations of the gNB 121.

Similarly, for the UE 110, antennas 177 transmit and receives RF signal under MIMO network. RF transceiver module 176, coupled with the antennas 177, receives RF signals from the antennas 177, converts them to baseband signals and sends them to processor 173. The RF transceiver 176 also converts received baseband signals from the processor 173, converts them to RF signals, and sends out to antennas 177. Processor 173 processes the received baseband signals and invokes different functional modules and circuits to perform features in the UE 110. Memory 172 stores program instructions and data 170 to control the operations of the UE 110.

Although a specific number of the antennas 177 and 197 are depicted in FIG. 2, it is contemplated that any number of the antennas 177 and 197 may be introduced under the MIMO network.

The gNB 121 and the UE 110 also include several functional modules and circuits that can be implemented and configured to perform embodiments of the present invention. In the example of FIG. 2, the gNB 121 includes a set of control functional modules and circuits 180. Channel state information (CSI) handling circuit 182 handles CSI and associated network parameters for the UE 110. Configuration and control circuit 181 provides different parameters to configure and control the UE 110. The UE 110 includes a set of control functional modules and circuits 160. CSI handling circuit 162 handles CSI and associated network parameters. Configuration and control circuit 161 handles configuration and control parameters from the gNB 121. In one embodiment, the set of control functional modules and circuits 160 is configured with a CSI-RS module that receives at least one CSI-RS from a network; an estimation module that estimates a basis matrix and a coefficient matrix of a downlink channel matrix based on the at least one CSI-RS, wherein the basis matrix is an N-dimensional non-orthogonal matrix and the coefficient matrix is a linear combination coefficient matrix associated with the basis matrix, and wherein N is greater than two; and a feedback module that transmits at least one feedback comprising feeding back the basis matrix in a first periodicity and feeding back the coefficient matrix in a second periodicity to the network.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3:
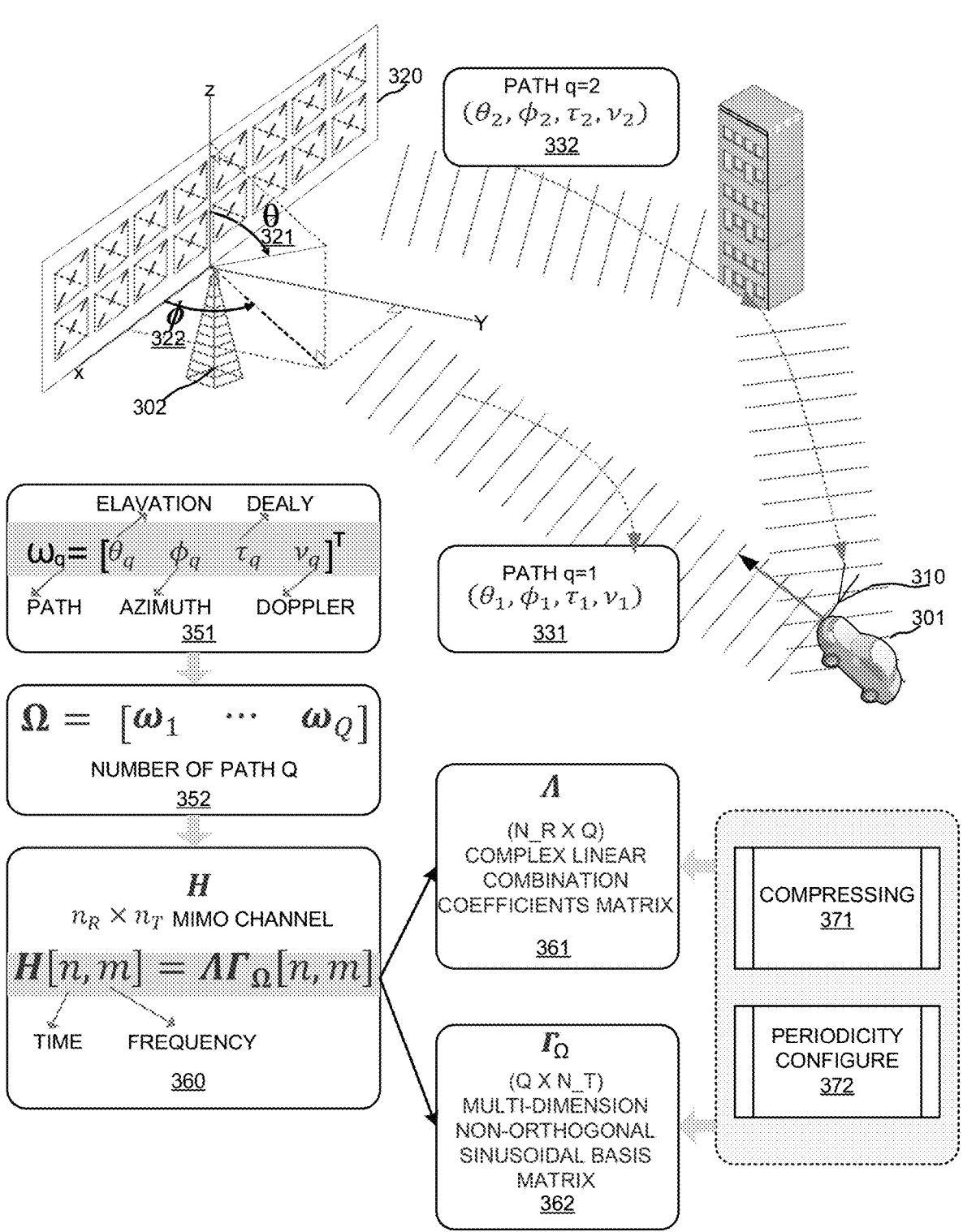
FIG. 3 illustrates exemplary diagrams of geometrical model for multi-dimensional MIMO channel and CSI feedback with a basis matrix and a coefficient matrix in accordance with embodiments of the current invention.

FIG. 3 illustrates exemplary diagrams of a geometrical model for multi-dimensional MIMO channel and CSI feedback with a basis matrix and a coefficient matrix in accordance with embodiments of the current invention. A UE 301 with MIMO transceiver/antennas 310 established RF link with gNB 302 with transceiver array 320. There are multiple, 1 to Q, transceiving paths for the link between UE 301 and gNB 302. Each path is defined by an elevation angle θ 321, an azimuth angle φ 322, a delay τ, and a doppler ν. An exemplary illustration of a first path (q=1) 331, which is a line of sight path and a second path (q=2) 332 are shown in FIG. 3. The channel between the gNB antenna array 320 and one RX antenna i of antennas 310 is determined by the number of paths Q and the parameter vector $\omega_q$ 351 for each path q. The multi-path channel with number of Q paths is modelled as matrix Ω 352, where $\Omega=[\omega_1, \omega_2, \ldots \omega_q]$.

In one exemplary scenario, gNB 302 transmits at least one channel state information reference signal (CSI-RS) to UE 301. The UE 301 receives the at least one CSI-RS from gNB 302. UE 301 estimates at least one covariance matrix of at least one downlink channel matrix according to the at least one CSI-RS at different times n and frequencies m. In some embodiments, UE 301 estimates the covariance matrices of the downlink channel matrices according to the CSI-RSs at different times and frequencies. In particular, after receiving the CSI-RSs at different times and frequencies, the UE 110 estimates the downlink channel matrices H[n,m] of $n_R \times n_T$ MIMO channels as below:

$$H[n, m] = \begin{bmatrix} h_{11}[n, m] & \cdots & h_{1n_T}[n, m] \\ \vdots & \ddots & \vdots \\ h_{n_R 1}[n, m] & \cdots & h_{n_R n_T}[n, m] \end{bmatrix}$$

$n_R$ is the number of receiving antennas (i.e., antennas 310). $n_T$ is number of transmitting antennas (i.e., antennas 320). n is time domain index. m is frequency domain index. Assuming the complex channel gain for the RX antenna i of the path q is $\lambda_{iq}$.

$$h_{ij}[n, m] = \sum_{q=1}^{Q} \lambda_{iq} e^{-j2\pi k(j)\theta_q + j2\pi l(j)\phi_q - j2\pi m \tau_q + j2\pi n v_q}$$

Which can be represented as:

$$h_{ij}[n, m] = \sum_{q=1}^{Q} \lambda_{iq} \gamma_{qj}[n, m]$$

Wherein $\gamma_{qj}[n, m] = e^{-j2\pi k(j)\theta_q + j2\pi l(j)\phi_q - j2\pi m \tau_q + j2\pi n v_q} = e^{j2\pi[-k(j)\ l(j)\ m\ n]\omega_q}$ In one novel aspect, the channel matrices H[n,m] is modeled as a linear combination of multi-dimensional complex sinusoids. In one embodiment 360, the time-frequency MIMO channel is modeled as a linear combination of 4-D basis represented as:

$$H[n,m] = \Lambda\Gamma_\Omega[n,m]$$

$\Lambda$ 361 is the complex linear combination matrix of dimension $n_R \times Q$:

$$\Lambda = \begin{bmatrix} \lambda_{11} & \cdots & \lambda_{1Q} \\ \vdots & \ddots & \vdots \\ \lambda_{n_R 1} & \cdots & \lambda_{n_R Q} \end{bmatrix}$$

and the 4-D sinusoidal basis $\Gamma_\Omega$ 362 with dimension of $Q \times n_T$ is represented as:

$$\Gamma_\Omega[n, m] = \begin{bmatrix} \gamma_{11}[n, m] & \cdots & \lambda_{1n_T}[n, m] \\ \vdots & \ddots & \vdots \\ \gamma_{Q1}[n, m] & \cdots & \gamma_{Qn_T}[n, m] \end{bmatrix}$$

In one novel aspect, CSI feedback is sent to the network based on the estimation of the multi-dimensional non-orthogonal basis matrix 362 and the linear combination coefficient matrix 361. The feedback of the basis matrix may be accomplished by feeding back matrix $\Omega$. The basis matrix $\Gamma_\Omega$ can be reconstructed based on the formulation above accordingly. The basis matrix is parameterized by a group of N-dimensional parameter sets. The feeding back of the basis matrix is accomplished by feeding back the group of N-dimensional parameter sets. In one embodiment 371, the CSI estimation matrices are compressed before sending the feedback. In one embodiment 372, periodicity is configured for the compressed feedback CSI matrices.

Figure 4:
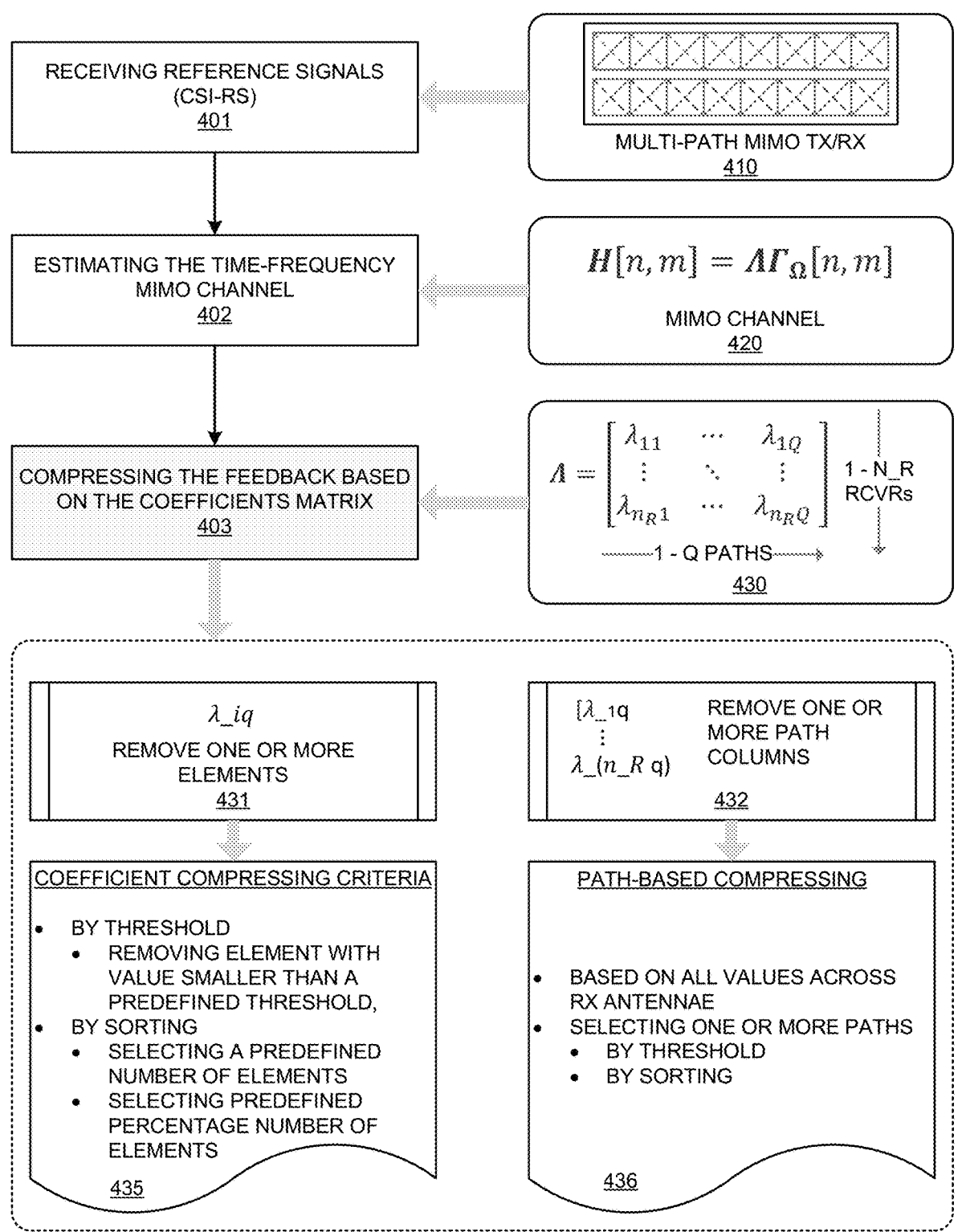
FIG. 4 illustrates exemplary diagrams for CSI feedback compression based on the coefficient matrix in accordance with embodiments of the current invention.

FIG. 4 illustrates exemplary diagrams for CSI feedback compression based on the coefficient matrix in accordance with embodiments of the current invention. At step 401, the UE receives at least one CSI-RS from the network. In one embodiment 410, the TX antenna is an antenna array. The number of TX antenna $n_T$ is determined by $N_p$, the number of elements in elevation and $M_p$, the number of elements in azimuth and a number of polarization $N_{pol}$. As illustrated, $N_p=2$, $M_p=8$ and $N_{pol}=2$. $n_T=M_p N_p N_{pol}=32$. At step 402, the UE estimates the time-frequency MIMO channel based on multi-dimensional non-orthogonal basis and corresponding linear combination coefficients. In one embodiment 420, MIMO channel in the time-frequency is modeled as a linear combination of the 4-D basis:

$$H[n,m] = \Lambda\Gamma_\Omega[n,m]$$

At step 403, the estimation is compressed for feedback based on the coefficient matrix. The CSI feedback will be compressed based on the feedback overhead. The feedback of $\Lambda$ and $\Omega$ is reduced based on the $\Lambda$ 430. $\Lambda$ 430 is $n_R \times Q$ representing 1-Q columns of paths and 1-$n_R$ rows of receiving antennas.

In one embodiment 431, one or more elements ($\lambda_{iq}$) of the coefficient matrix $\Lambda$ are removed based on one or more coefficient compressing criteria. In one embodiment 435, the one or more coefficient compressing criteria comprise removing element(s) with value smaller than a predefined threshold, and/or selecting a predefined number of elements, and/or selecting a predefined percentage number of elements. In one example, if element $\lambda_{iq}$'s is "small" compared with other elements, it may be ignored from feedback. In one embodiment, the determination of "small" is by comparing the element with a threshold. The threshold may be predefined or is derived based on all or a subset of element values in $\Lambda$. In another embodiment, the determination of "small" is by sorting. In one example, a fixed number of elements with biggest values are selected. The value of the fixed number can be predefined or dynamically configured or derived. In another example, a fixed ratio among all elements is selected. The value of the fixed ratio can be predefined or dynamically configured or derived.

In one embodiment 432, one or more path columns are removed based on one or more path-based compression criteria. One or more elements of the coefficient matrix are removed based on all values across all receiving antennas for each path and one or more paths are identified to be compressed. In one embodiment, one or more elements of the coefficient matrix are removed based on all values across all element values in a first dimension denoting a path of the coefficient matrix, and wherein elements in a second dimension of the coefficient matrix are identified to be compressed. In one embodiment 436, the path-based compressing criteria is based on all values across the RX antennas for a fixed path. In one embodiment, one or more values of the path are compared with a threshold or one or more paths are selected by sorting. For example, the selection is based on all values across RX antennas i for a fixed path q, that is, $\lambda'_{iq}$s for i=1, ... $n_R$. In one embodiment, if a path q is determined for not feedback, its associated $\omega_q$ does not feedback either. The determination of a path q not to be feedback may be based on a function of $\lambda'_{iq}$s for i=1, ... $n_R$. In one embodiment, the selection of one or more paths for removing is by comparing the value(s) across the path with a path threshold. In one embodiment, the path threshold is predefined. In another embodiment, the path threshold is dynamically configured or derived. In another embodiment, the selection of one or more paths for removing is by sorting. In one example, a fixed number of paths/columns with biggest values are selected. The value of the fixed number can be predefined or dynamically configured or derived. In another example, a fixed ratio among all paths/columns is selected. The value of the fixed ratio can be predefined or dynamically configured or derived. It is noted that when path q is needed for feedback, feeding back $\omega_2$ may be enough for deriving its associated sinusoidal basis in $\Gamma_\Omega$.

Figure 5:
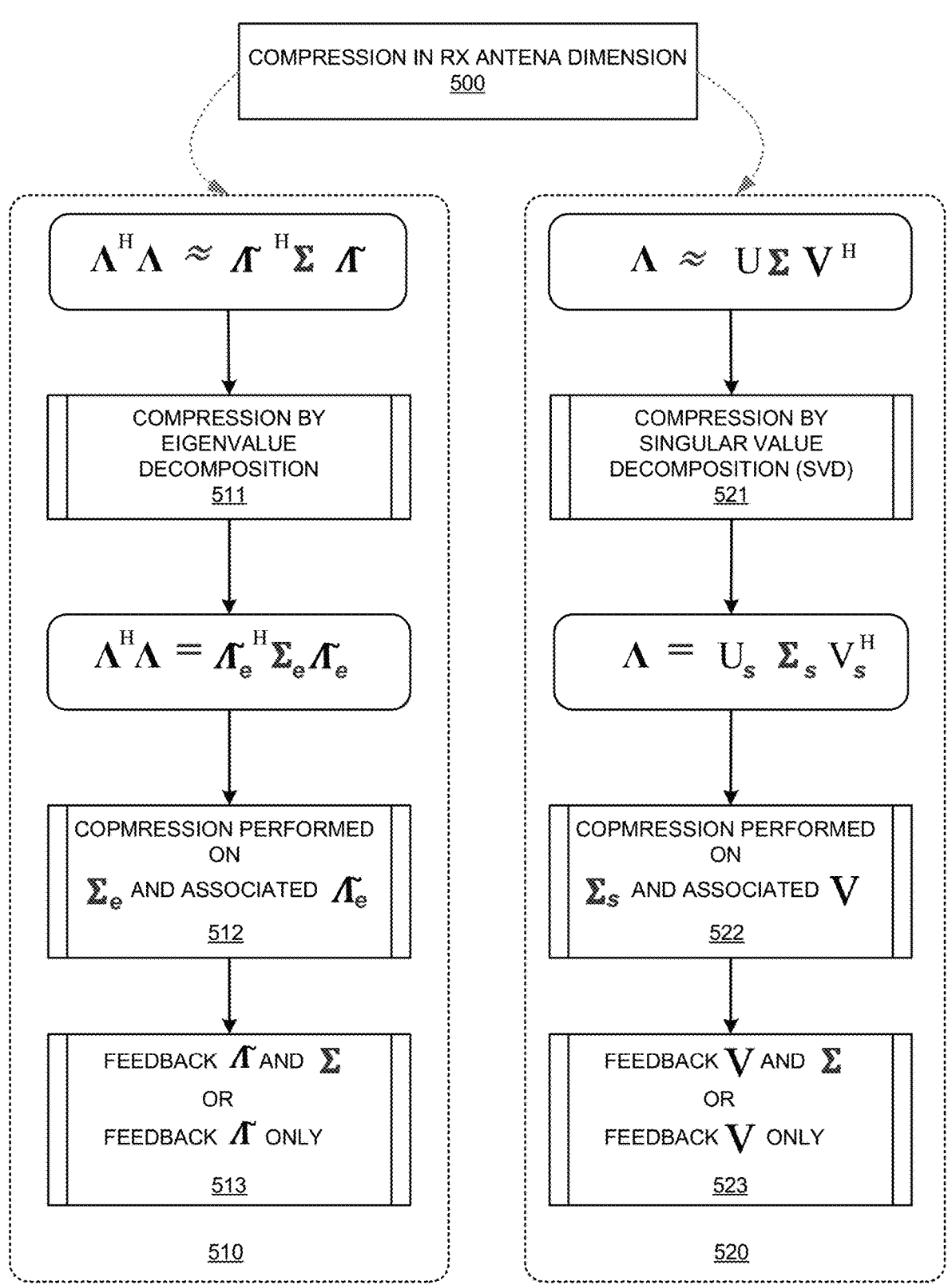
FIG. 5 illustrates exemplary diagrams for CSI feedback compression in RX antenna dimension in accordance with embodiments of the current invention.

FIG. 5 illustrates exemplary diagrams for CSI feedback compression in RX antenna dimension in accordance with embodiments of the current invention. The CSI feedback may be compressed by reducing one of the dimensions of the coefficient matrix by compressing a decomposition matrix derived from the coefficient matrix. In one embodiment 500, the CSI feedback is compressed in RX antenna dimension by eigenvalue decomposition (EVD) or by singular value decomposition (SVD). The CSI feedback matrix $\Lambda$ is of dimension $n_R \times Q$. If the RX antennas are correlated (due to proximity for example), the rank of $\Lambda$ may be smaller than $n_R$, or at least the number of significant eigenvalues of $\Lambda$ is smaller than $n_R$. Therefore, we can further compress the CSI feedback from the RX antenna dimension into the smaller rank dimension.

In one embodiment 510, the compressing reduces receiving antenna dimension by eigenvalue decomposition. $\Lambda$ is of dimension $n_R \times Q$. The dimension of RX antenna $n_R$ can be reduced to $\rho$, where $\rho \leq n_R$. The product of coefficient matrix $\Lambda$ and its Hermitian transpose $\Lambda^H$ can be expressed as:

$$\Lambda^H \Lambda \approx \tilde{\Lambda}^H \Sigma \tilde{\Lambda}$$

where $\Sigma$ is a $\rho \times \rho$ diagonal matrix with $\rho \leq n_R$, $\tilde{\Lambda}$ is a $\rho \times Q$ rank-reduced matrix containing the linear combination coefficients, $\tilde{\Lambda}^H$ with the dimension of $Q \times \rho$ is the Hermitian transpose of $\tilde{\Lambda}$.

At step 511, the feedback of $\Lambda$ is then further compressed by eigenvalue decomposition and obtains $\Lambda^H \Lambda = \widetilde{\Lambda_e}^H \Sigma_e \widetilde{\Lambda_e}$ (with equality sign). In $\Lambda^H \Lambda \approx \tilde{\Lambda}^H \Sigma \tilde{\Lambda}$, the "$\approx$" may imply that compression has been performed based on the diagonal matrix $\Sigma_e$. At step 512, compression is performed on $\Sigma_e$ and associated $\widetilde{\Lambda_e}$. In one embodiment, eigenvalue decomposition facilitates removing one or more elements of a diagonal matrix for the coefficient matrix along with corresponding eigenvalues based on one or more criteria comprising removing elements smaller than a predefined threshold, selecting a predefined number of elements, and selecting a predefined percentage number of elements. In one embodiment for compressing, the values of $\Sigma_e$ less than a threshold is ignored/removed from feedback, so does their associated eigenvectors in $\widetilde{\Lambda_e}$. In one embodiment, the threshold is predefined. In another embodiment, the threshold is dynamically configured or derived. In another embodiment for compressing, a fixed number of eigenvalues are fed back along with their associated eigenvectors in $\widetilde{\Lambda_e}$. Others are ignored/removed from feedback. In one embodiment, the value of the fixed number is predefined. In another embodiment, the value of the fixed number is dynamically configured or derived. In yet another embodiment for compressing, a fixed ratio among all eigenvalues is fed back along with their associated eigenvectors in $\widetilde{\Lambda_e}$. Others are ignored/removed from feedback. In one embodiment, the value of the fixed ratio is predefined. In another embodiment, the value of the fixed ratio is dynamically configured or derived. In other embodiments for compressing, only eigenvectors associated with the selected feedback eigenvalues are fed back while eigenvectors associated with eigenvalues that are not selected are removed from feedback. After compressing, at step 513, compressed $\tilde{\Lambda}$ and $\Sigma$ are sent as CSI feedback. Alternatively, only $\tilde{\Lambda}$ are sent as CSI feedback for additional overhead reduction. In one embodiment, the feedback coefficient matrix is derived by projecting the coefficient matrix on the at least one eigenvector matrix.

In one embodiment 520, the compressing reduces CSI feedback in receiving antenna dimension by SVD. $\Lambda$ is of dimension $n_R \times Q$. The dimension of RX antenna $n_R$ can be reduced to $\rho$, where $\rho \leq n_R$. The coefficient matrix $\Lambda$ can be expressed as:

$$\Lambda \approx U \Sigma V^H$$

Where $\Sigma$ is a $\rho \times \rho$ diagonal matrix with $\rho \leq n_R$, $\rho < Q$;

U is a $n_R \times \rho$ rank-reduced matrix containing left eigen vector;

V is a $Q \times \rho$ rank-reduced matrix containing right eigen vector;

$V^H$ with the dimension of $\rho \times Q$ is the Hermitian transpose of V.

At step 521, the feedback of $\Lambda$ is then further compressed by SVD and obtains $\Lambda = U_s \Sigma_s V_s^H$ (with equality sign). In $\Lambda \approx U \Sigma V^H$ the "$\approx$" may imply that compression has been performed based on the diagonal matrix $\Sigma_s$. At step 522, compression is performed on $\Sigma_s$ and its associated V. In one embodiment, SVD facilitates removing one or more elements of a diagonal matrix for the coefficient matrix along with corresponding V based on one or more criteria comprising removing elements smaller than a predefined threshold, selecting a predefined number of elements, and selecting a predefined percentage number of elements. In one embodiment for compressing, the values of $\Sigma_s$ less than a threshold is ignored/removed from feedback, so does their associated eigenvectors in V. In one embodiment, the threshold is predefined. In another embodiment, the threshold is dynamically configured or derived. In another embodiment for compressing, a fixed number of eigenvalues are fed back along with their associated eigenvectors in V. Others are ignored/removed from feedback. In one embodiment, the value of the fixed number is predefined. In another embodiment, the value of the fixed number is dynamically configured or derived. In yet another embodiment for compressing, a fixed ratio among all eigenvalues are fed back along with their associated eigenvectors in V. Others are ignored/removed from feedback. In one embodiment, the value of the fixed ratio is predefined. In another embodiment, the value of the fixed ratio is dynamically configured or derived. In other embodiments for compressing, only eigenvectors associated with the selected feedback eigenvalues are fed back. Selected non-feedback eigenvalues are removed. After compressing, at step 523, compressed V and $\Sigma$ are sent as CSI feedback. Alternatively, only V are sent as CSI feedback for additional overhead reduction.

It is noted that since $H[n,m] = \Lambda \Gamma_\Omega[n,m]$ in our formulation, $\hat{H}[n,m] \triangleq U_s^H H[n,m] = U_s^H \Lambda \Gamma_\Omega[n,m] = U_s^H (U_s \Sigma_s V_s^H) \Gamma_\Omega[n,m] = \Sigma_s V_s^H \Gamma_\Omega[n,m] \triangleq \hat{\Lambda} \Gamma_\Omega[n,m]$, where $U_s$ is the $n_R \times \rho$ left eigenvector of $\Lambda$ above and $\hat{\Lambda} \triangleq \widetilde{\Lambda_e} \Sigma_s V_s^H$. Compressing (and then reporting) $\Lambda$ is the same as compressing (and then reporting) $\hat{\Lambda}$ for reconstructing $H[n,m]$ and $\hat{H}[n,m]$, respectively. From precoder derivation at BS perspective, $H[n,m]$ and $\hat{H}[n,m]$ provide similar information and either compression alternative may do.

Figure 6:
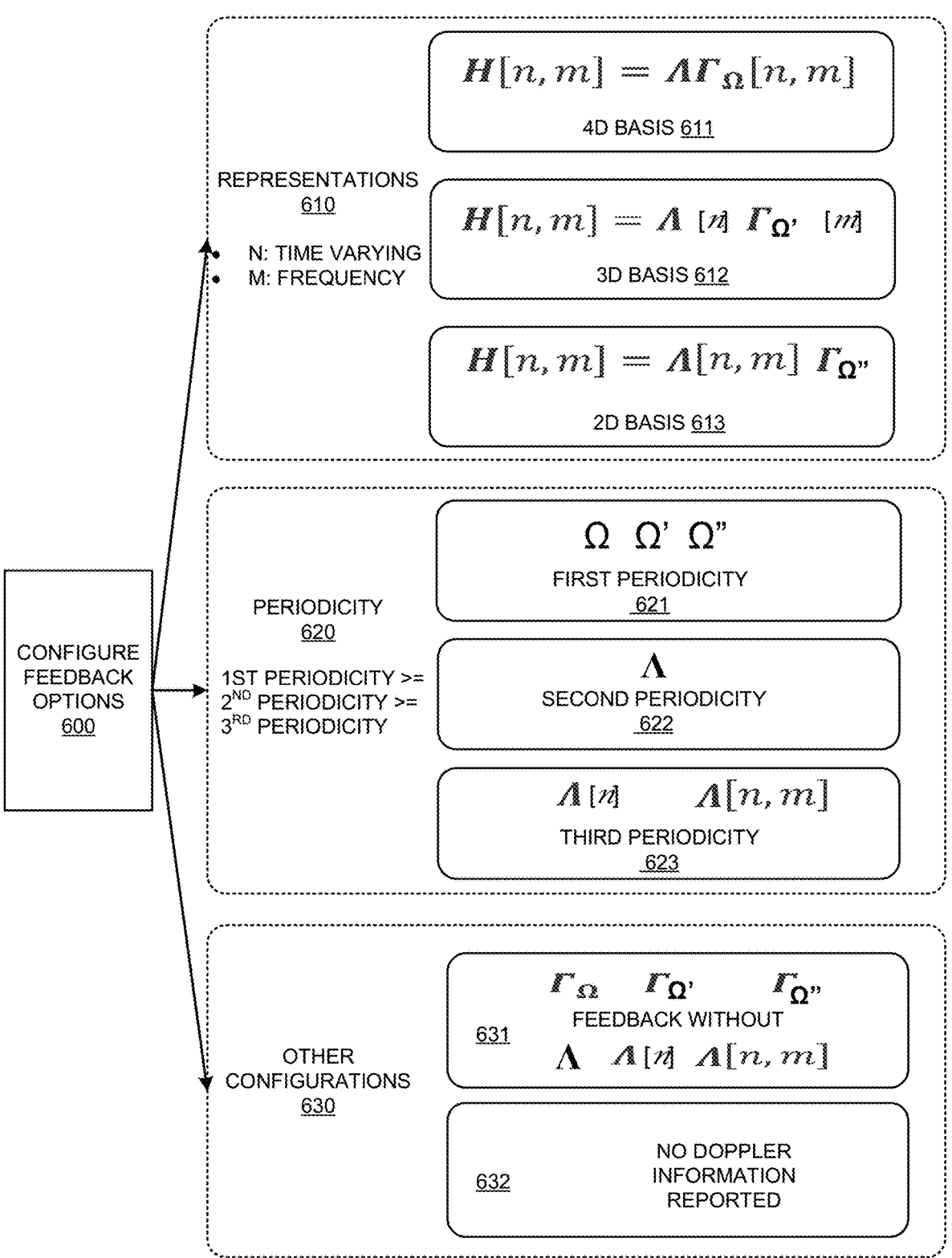
FIG. 6 illustrates exemplary diagrams for different options for CSI feedback including the representation, periodicity, and other configuration in accordance with embodiments of the current invention.

FIG. 6 illustrates exemplary diagrams for different options for CSI feedback including the representation, periodicity, and other configuration in accordance with embodiments of the current invention. In one embodiment 600, one or more feedback options are configured. In one embodiment 610, different representations can be configured as different feedback options. The basis matrix is in a format of 4D (4 dimension), 3D (3 dimension), or 2D (2 dimension). The MIMO channel model H[n,m] has the time domain index n and the frequency domain index m.

In a 4D-basis representation 611:

$$\Omega = \begin{bmatrix} \theta_1 & \cdots & \theta_Q \\ \phi_1 & \cdots & \phi_Q \\ \tau_1 & \cdots & \tau_Q \\ v_1 & \cdots & v_Q \end{bmatrix} = [\omega_1 \cdots \omega_Q],$$

$$\Lambda = \begin{bmatrix} \lambda_{11} & \cdots & \lambda_{1Q} \\ \vdots & \ddots & \vdots \\ \lambda_{n_R 1} & \cdots & \lambda_{n_R Q} \end{bmatrix}$$

and $$H[n, m] = \Lambda \Gamma_\Omega [n, m]$$

Where $\Lambda$ and $\Omega$ are constants or slow-varying.

In a 3D-basis representation 612, time index n is absorbed into linear combination coefficients $\lambda_{iq}$, and $\lambda_{i,q}[n] = \lambda_{iq} e^{j2\pi n v_d} = e^{j2\pi [0\ 0\ 0\ n]\omega_q}$ accordingly, wherein $$\Omega' = \begin{bmatrix} \theta_1 & \cdots & \theta_Q \\ \phi_1 & \cdots & \phi_Q \\ \tau_1 & \cdots & \tau_Q \end{bmatrix}$$

$$\Omega'_n = [v_1 \ \cdots \ v_Q],$$

$$\Omega = \begin{bmatrix} \Omega' \\ \Omega'_n \end{bmatrix} = [\omega_1 \ \cdots \ \omega_Q],$$

and $$H[n, m] = \Lambda[n] \Gamma_{\Omega'}[m]$$

where $$\Lambda[n] = \begin{bmatrix} \lambda_{11}[n] & \cdots & \lambda_{1Q}[n] \\ \vdots & \ddots & \vdots \\ \lambda_{n_R 1}[n] & \cdots & \lambda_{n_R Q}[n] \end{bmatrix},$$

$$\int_{\Omega'} [m] = \begin{bmatrix} \gamma_{11}[m] & \cdots & \gamma_{1n_T}[m] \\ \vdots & \ddots & \vdots \\ \gamma_{Q1}[m] & \cdots & \gamma_{Qn_T}[m] \end{bmatrix}$$

Where $\Omega'$ is constant or slow-varying.

In a 2D-basis representation 613, time index n and frequency index m are both absorbed into linear combination coefficients $\lambda_{iq}$, and $\lambda_{iq}[n,m] = \lambda_{iq} e^{-j2\pi m\tau + 2\pi n v_d} = e^{j2\pi [0\ 0\ -m\ n]\omega^q}$ as a result, wherein $$\Omega'' = \begin{bmatrix} \theta_1 & \cdots & \theta_Q \\ \phi_1 & \cdots & \phi_Q \end{bmatrix}$$

$$\Omega''_{n,m} = \begin{bmatrix} \tau_1 & \cdots & \tau_Q \\ v_1 & \cdots & v_Q \end{bmatrix}$$

and $$H[n, m] = \Lambda[n, m] \Gamma_{Q''}$$

where $$\Lambda[n, m] = \begin{bmatrix} \lambda_{11}[n, m] & \cdots & \lambda_{1Q}[n, m] \\ \vdots & \ddots & \vdots \\ \lambda_{n_R 1}[n, m] & \cdots & \lambda_{n_R Q}[n, m] \end{bmatrix}$$

-continued $$\Gamma_{Q''} = \begin{bmatrix} \gamma_{11} & \cdots & \gamma_{1n_T} \\ \vdots & \ddots & \vdots \\ \gamma_{Q1} & \cdots & \gamma_{Qn_T} \end{bmatrix}$$

Where $\Omega''$ is constant or slow-varying.

In one embodiment 620, based on the representation, feedback periodicity is configured accordingly. In one embodiment, the parameters for deriving basis matrix are constant or slow varying, and its associated feedback is provided in a first periodicity. In one embodiment, the coefficient matrix does not include timing-varying components (that is, without time index n), and are constant or slow varying. The associated feedback for the coefficient matrix are transmitted in a second periodicity. In one embodiment, the second periodicity is longer than or equal to the first periodicity. In another embodiment, the coefficient matrix includes time-varying components, and wherein the time-varying coefficient matrix is transmitted in a third periodicity that is shorter than the first periodicity or shorter than the second periodicity. In one embodiment 621, $\Omega$, $\Omega'$, $\Omega''$ in 4D/3D/2D basic matrix, respectively, are constants or slow-varying and are configured with a first periodicity for feedback. In one embodiment 622, $\Lambda$ is constants or slow-varying, and is configured with a second periodicity for feedback. The second periodicity is equal to or longer than the first periodicity. In one embodiment 623, $\Lambda[n]$, $\Lambda[n,m]$ are time-varying faster than $\Lambda$, $\Omega$, $\Omega'$, $\Omega''$, and are configured with a third periodicity for feedback. The third periodicity is shorter than the first periodicity. The third periodicity is shorter than the second periodicity. It is noted that for CSI feedback purpose, one out of 2D/3D/4D representation may be used (for example by configuration). The compression details and periodicity setting may follow the used representation accordingly as discussed above.

In one embodiment 630, other configurations for feedback are available. In one embodiment 631, $\Gamma_\Omega$, $\Gamma_{\Omega'}$, $\Gamma_{\Omega''}$ may be fed back without accompanying $\Lambda$, $\Lambda[n]$, $\Lambda[n,m]$. Only the basis matrix (or the parameters for deriving the basis matrix) is transmitted as a feedback when the feedback is for acquiring spatial domain channel characteristics, for example, beam direction acquisition. In one embodiment, $\Gamma_\Omega''$ is fed back for acquiring spatial domain characteristics of the channel for (analog) beam direction acquisition. In one embodiment 632, no doppler information is reported. The information related to $v_q$ and its index n may not be included in the corresponding 2D/3D/4D representation and accordingly, may not be fed back.

FIG. 7 illustrates an exemplary flow chart for the CSI compression and feedback based on multi-dimensional MIMO RF signature in accordance with embodiments of the current invention. At step 701, the UE receives at least one channel state information-reference signal (CSI-RS) from a network. At step 702, the UE estimates a basis matrix and a coefficient matrix of a downlink channel matrix based on the at least one CSI-RS, wherein the basis matrix is an N-dimensional (non-orthogonal) sinusoidal matrix and the coefficient matrix is a linear combination coefficient matrix associated with the basis matrix, and wherein N is greater than two. At step 703, the UE transmits to the network at least one feedback comprising feeding back the basis matrix in a first periodicity and feeding back the coefficient matrix in a second periodicity.

Although the present invention has been described in connection with certain specific embodiments for instructional purposes, the present invention is not limited thereto.

Accordingly, various modifications, adaptations, and combinations of various features of the described embodiments can be practiced without departing from the scope of the invention as set forth in the claims.

What is claimed is:

1. A method, comprising:

receiving, by a user equipment (UE), at least one channel state information-reference signal (CSI-RS) from a network;

estimating, by the UE, a basis matrix and a coefficient matrix of a downlink channel matrix based on the at least one CSI-RS, wherein the basis matrix is a N-dimensional sinusoidal matrix and the coefficient matrix is a linear combination coefficient matrix associated with the basis matrix, and wherein N is greater than two, and wherein the basis matrix and the coefficient matrix describe the downlink channel matrix;

compressing, by the UE, the basis matrix and the coefficient matrix to a feedback basis matrix and a feedback coefficient matrix, wherein the compressing reduces one of the dimensions of the coefficient matrix by compressing a decomposition matrix derived from the coefficient matrix; and transmitting, by the UE to the network, at least one feedback comprising feeding back the feedback basis matrix in a first report and feeding back the feedback coefficient matrix in a second report.

2. The method of claim 1, wherein one or more elements of the coefficient matrix are removed based on one or more coefficient compressing criteria comprising: removing one or more elements with value smaller than a predefined threshold, selecting a predefined number of elements, and selecting a predefined percentage number of elements.

3. The method of claim 1, wherein one or more elements of the coefficient matrix are removed based on all values across all element values in a first dimension denoting a path of the coefficient matrix, and wherein elements in a second dimension of the coefficient matrix are identified to be compressed.

4. The method of claim 1, wherein the decomposition matrix is associated with at least one diagonal eigenvalue matrix and at least one eigenvector matrix, and the compressing of the decomposition matrix is based on the eigenvalues of the at least one diagonal eigenvalue matrix.

5. The method of claim 4, wherein the feedback coefficient matrix is derived by projecting the coefficient matrix on the at least one eigenvector matrix.

6. The method of claim 4, wherein one or more eigenvalues of the at least one diagonal eigenvalue matrix and the associated eigenvectors of the at least one eigenvector matrix are removed from the feedback coefficient matrix and the feedback basis matrix based on one or more criteria comprising removing eigenvalues smaller than a predefined threshold, selecting a predefined number of eigenvalues, and selecting a predefined percentage number of eigenvalues.

7. The method of claim 1, wherein the first report follows a first periodicity and the second report follows a second periodicity, and the second periodicity is longer than or equal to the first periodicity.

8. The method of claim 7, wherein the feedback coefficient matrix is transmitted in a third report that follows a third periodicity that is shorter than the first periodicity or shorter than the second periodicity.

9. The method of claim 1, wherein the coefficient matrix further includes frequency components.

10. The method of claim 1, wherein only the basis matrix is transmitted as a feedback when the feedback is for acquiring spatial domain channel characteristics for beam direction acquisition.

11. The method of claim 1, wherein doppler information components are not included in the basis matrix.

12. The method of claim 1, further comprising:

receiving a feedback configuration from the network, wherein the feeding back the feedback basis matrix and the feeding back the feedback coefficient matrix are based on the feedback configuration.

13. The method of claim 1, wherein the basis matrix is parameterized by a group of N-dimensional parameter sets, and wherein the feeding back of the feedback basis matrix is accomplished by feeding back the group of N-dimensional parameter sets.

14. A user equipment (UE) comprising:

An RF transceiver that transmits and receives radio frequency (RF) signal in a network;

a channel state information-reference signal (CSI-RS) module that receives at least one CSI-RS from a network via the RF transceiver;

an estimation module that estimates a basis matrix and a coefficient matrix of a downlink channel matrix based on the at least one CSI-RS, wherein the basis matrix is an N-dimensional sinusoidal matrix and the coefficient matrix is a linear combination coefficient matrix associated with the basis matrix, and wherein N is greater than two, and wherein the basis matrix and the coefficient matrix describe the downlink channel matrix;

a compression module that compresses the basis matrix and the coefficient matrix to a feedback basis matrix and a feedback coefficient matrix, wherein the compressing reduces one of the dimensions of the coefficient matrix by compressing a decomposition matrix derived from the coefficient matrix; and a feedback module that transmits at least one feedback comprising feeding back the feedback basis matrix in a first report and feeding back the feedback coefficient matrix in a second report.

15. The UE of claim 14, wherein one or more elements of the coefficient matrix are removed based on one or more coefficient compressing criteria.

16. The UE of claim 14, wherein the first report follows a first periodicity and the second report follows a second periodicity, and the second periodicity is longer than or equal to the first periodicity, and wherein the feedback coefficient matrix is transmitted in a third report that follows a third periodicity that is shorter than the first periodicity or shorter than the second periodicity.

17. The UE of claim 14, wherein the feedback module receives a feedback configuration from the network, and wherein the feeding back the feedback basis matrix and the feeding back the feedback coefficient matrix are based on the feedback configuration.

18. The UE of claim 14, wherein the basis matrix is parameterized by a group of N-dimensional parameter sets, and wherein the feeding back of the feedback basis matrix is accomplished by feeding back the group of N-dimensional parameter sets.

* * * * *